United States Patent
Gstöhl et al.

(10) Patent No.: US 10,442,457 B2
(45) Date of Patent: Oct. 15, 2019

(54) STEERING COLUMN HAVING AN ADAPTABLE PIVOT SUPPORT

(71) Applicants: THYSSENKRUPP PRESTA AG, Eschen (LI); thyssenkrupp AG, Essen (DE)

(72) Inventors: Eric Gstöhl, Eschen (LI); Sven Hausknecht, Dornbirn (AT); Stefan-Hermann Loos, Heerbrugg (CH); Frank Pasch, Buchs (CH); Christian Geissler, Buchs (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 144 days.

(21) Appl. No.: 15/542,300

(22) PCT Filed: Sep. 22, 2015

(86) PCT No.: PCT/EP2015/071745
§ 371 (c)(1),
(2) Date: Jul. 7, 2017

(87) PCT Pub. No.: WO2016/110336
PCT Pub. Date: Jul. 14, 2016

(65) Prior Publication Data
US 2018/0265115 A1 Sep. 20, 2018

(30) Foreign Application Priority Data
Jan. 8, 2015 (DE) .................. 10 2015 000 029

(51) Int. Cl.
*B62D 1/187* (2006.01)
*B62D 1/16* (2006.01)
(Continued)

(52) U.S. Cl.
CPC ............. *B62D 1/187* (2013.01); *B62D 1/16* (2013.01); *B62D 1/185* (2013.01); *B62D 1/189* (2013.01); *B62D 1/195* (2013.01)

(58) Field of Classification Search
CPC ......... B62D 1/187; B62D 1/189; B62D 1/185
See application file for complete search history.

(56) References Cited

U.S. PATENT DOCUMENTS

| 5,081,879 A | 1/1992 | Pidgeon |
| 6,237,954 B1 * | 5/2001 | Sato ................ B62D 1/184 |
| | | 280/775 |

(Continued)

FOREIGN PATENT DOCUMENTS

| CN | 202413903 U | 9/2012 |
| CN | 203558120 U | 4/2014 |

(Continued)

OTHER PUBLICATIONS

English translation of International Search Report issued in PCT/EP2015/071745 dated Dec. 10, 2015 (dated Dec. 17, 2015).

(Continued)

*Primary Examiner* — Nicole T Verley
(74) *Attorney, Agent, or Firm* — thyssenkrupp North America, Inc.

(57) ABSTRACT

A steering column may comprise a casing tube and a steering spindle that is mounted in the casing tube so as to be rotatable about a longitudinal axis. The steering column may further comprise fastening elements for fastening the steering column on the vehicle body. The steering column may include a pivot bearing for height adjustment of the steering column. The pivot bearing may be provided on a region of the steering column that is remote from the steering wheel.

(Continued)

Further, the pivot bearing may be disposed or formed in a supporting element that is fastened non-releasably on the casing tube.

11 Claims, 3 Drawing Sheets

(51) Int. Cl.
*B62D 1/189* (2006.01)
*B62D 1/185* (2006.01)
*B62D 1/19* (2006.01)

(56) References Cited

U.S. PATENT DOCUMENTS

| | | | | |
|---|---|---|---|---|
| 6,394,493 | B1 | 5/2002 | Kieserling | |
| 6,942,417 | B2 * | 9/2005 | Schwarzbich | B62D 1/185 403/109.1 |
| 7,827,880 | B2 * | 11/2010 | Riefe | B62D 1/195 280/777 |
| 7,914,043 | B2 * | 3/2011 | Olgren | B62D 1/184 280/775 |
| 8,601,901 | B2 * | 12/2013 | Ishii | B62D 1/184 280/775 |
| 8,757,664 | B2 * | 6/2014 | Moriyama | B62D 1/184 280/775 |
| 8,863,609 | B2 * | 10/2014 | Tinnin | B62D 1/185 280/775 |
| 9,132,851 | B2 * | 9/2015 | Suzuki | B62D 1/187 |
| 9,233,706 | B2 * | 1/2016 | Schnitzer | B62D 1/16 |
| 9,604,661 | B2 * | 3/2017 | Watanabe | B62D 1/184 |
| 9,744,983 | B2 * | 8/2017 | Stinebring | B62D 1/181 |
| 9,834,245 | B2 * | 12/2017 | Orihara | B62D 1/184 |
| 9,889,875 | B2 * | 2/2018 | Matsuno | B62D 1/184 |
| 9,944,308 | B2 * | 4/2018 | Kurz | B62D 1/187 |
| 9,944,309 | B2 * | 4/2018 | Matsuno | B62D 1/19 |
| 10,000,229 | B2 * | 6/2018 | Matsuno | B62D 1/189 |
| 10,046,789 | B2 * | 8/2018 | Sugishita | B62D 1/184 |
| 10,065,671 | B2 * | 9/2018 | Sugishita | B62D 1/185 |
| 10,093,340 | B2 * | 10/2018 | Sugishita | B62D 1/184 |
| 10,183,689 | B2 * | 1/2019 | Matsuno | B62D 1/187 |
| 2006/0207378 | A1 * | 9/2006 | Kramer | B62D 1/16 74/492 |
| 2016/0052536 | A1 * | 2/2016 | Nicolussi | B62D 1/16 384/441 |
| 2016/0059879 | A1 * | 3/2016 | Tagaya | B62D 1/184 74/493 |
| 2017/0015345 | A1 * | 1/2017 | Galehr | B62D 1/181 |
| 2017/0113710 | A1 * | 4/2017 | Matsuno | B62D 1/187 |
| 2017/0361862 | A1 * | 12/2017 | Charvet | B62D 1/185 |
| 2018/0015942 | A1 * | 1/2018 | Sugiura | B62D 1/184 |
| 2018/0079445 | A1 * | 3/2018 | Kato | B62D 1/185 |
| 2018/0099687 | A1 * | 4/2018 | Stinebring | B62D 1/181 |
| 2018/0229755 | A1 * | 8/2018 | Kurokawa | B62D 1/185 |
| 2018/0237052 | A1 * | 8/2018 | Kurokawa | B62D 1/184 |
| 2018/0312189 | A1 * | 11/2018 | Geiger | B62D 1/189 |
| 2018/0346011 | A1 * | 12/2018 | Hagiwara | B62D 1/184 |

FOREIGN PATENT DOCUMENTS

| | | |
|---|---|---|
| DE | 19933676 A | 1/2001 |
| DE | 202013101188 U | 4/2013 |
| EP | 1847440 A | 10/2007 |
| FR | 3004154 A | 10/2014 |
| WO | 2014117800 A | 8/2014 |
| WO | 2014202247 A | 12/2014 |

OTHER PUBLICATIONS

English abstract of FR3004154.
English abstract of DE202013101188U.

\* cited by examiner

STEERING COLUMN HAVING AN ADAPTABLE PIVOT SUPPORT

CROSS REFERENCE TO RELATED APPLICATIONS

This application is a U.S. National Stage Entry of International Patent Application Serial Number PCT/EP2015/071745, filed Sep. 22, 2015, which claims priority to German Patent Application No. DE 10 2015 000 029.2 filed Jan. 8, 2015, the entire contents of both of which are incorporated herein by reference.

FIELD

The present disclosure generally relates to steering columns, including steering columns that are easily manufactured with minimal machinery.

BACKGROUND

Steering columns have diverse functions in motor vehicles. They firstly serve for fastening the steering wheel and for mounting the steering shaft or steering spindle on the vehicle body. They also serve for fastening add-on parts, such as, for example, an anti-theft means or operator control elements. The steering columns are sometimes also adjustable mechanically or electrically in the axial direction and vertical direction in order to be able to adapt the position of the steering wheel to the requirements of the driver. Finally, steering columns are also intended to yield in a controlled manner in the event of an impact of the vehicle against an obstacle, in order to absorb impact energy of the driver against the steering wheel and thereby to reduce the risk of injury for the driver. Along with all of these requirements, it is also required that steering columns take up little construction space, have a low weight and operate without play and noise.

One possibility of designing steering columns to be reasonably priced and lightweight consists in the use of extruded profiles. In comparison to die-cast components, extruded profiles have the advantage of low production costs.

Steering columns in which extruded profiles are used are therefore already known from the prior art.

The document U.S. Pat. No. 8,863,609 B2 discloses, for example, a steering column in which the casing unit, in more precise terms the outer casing tube, is manufactured from an extruded profile. This steering column has the particular characteristic that the tensioning pin for releasing and blocking the adjustment acts on one side on the outer casing tube and does not continue to the other side of the casing tube.

The document FR 3004154 presents a casing unit for a steering column, wherein the casing unit is produced from an extruded profile. The various functional portions required are, for example, fastening regions, guides for the adjustment function, bearing seats and gripping points for additional components.

This document also clearly shows that the bearing for the pivot axis of the vertical adjustment and an approximately helical slotted arrangement as an energy-absorbing "crash structure" are directly incorporated into the outer casing tube. This corresponds to the customary design of adjustable steering columns, and it makes the steering column complicated to produce since dedicated machining operations have to be carried out on the workpiece for said functional elements.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a steering column for a motor vehicle that has a simple construction and can be manufactured with a lower outlay of machining.

A steering column for a motor vehicle is proposed, with a casing tube and a steering spindle which is mounted in the casing tube so as to be rotatable about a longitudinal axis and is in particular telescopic in the longitudinal direction, and with fastening elements for fastening the steering column on the vehicle body, and with a pivot bearing for the height adjustment of the steering column, wherein the pivot bearing is provided on a region of the steering column that is remote from the steering wheel, the pivot bearing is arranged or formed in a supporting element which is designed as a separate component and is fastened non-releasably on the casing tube.

According to the invention, the supporting element is manufactured as a separate component and is provided for mounting at or on the casing tube.

By means of the configuration of the steering column according to the invention, the supporting element can be freely positioned on the casing tube without the casing tube itself having to be machined for this purpose. The supporting element can be structurally identical for different designs of steering columns. The supporting element is connected non-releasably to the casing tube at least during the normal operating state of the steering column or of the motor vehicle. In the event of a frontal impact of the vehicle, also referred to as a crash, a relative displacement of the casing tube in relation to the supporting element can be provided, as can energy absorption which exists therewith on the basis of the friction present between supporting element and casing tube.

The fastening elements for fastening the steering column on the vehicle body can be designed as a bracket, wherein such a bracket comprises at least one side cheek and a fastening portion on the vehicle body. However, the bracket preferably comprises two side cheeks which are spaced apart and are arranged substantially in parallel, wherein the casing tube is preferably arranged between the side cheeks.

In an advantageous development, the casing tube comprises a fastening structure which runs in the direction of the longitudinal axis and to which the supporting element is fastenable.

The fastening structure can therefore be formed in a simple manner in an extrusion operation by the production of the casing tube or the casing tube blank.

The casing tube and/or the supporting element are/is preferably designed as an extruded component. The fastening structure can be realized by profile contours of the extrusion profile that are particularly suitable for a non-releasable fastening of the supporting element, for example in order to form a form-fitting, force-fitting and/or integrally bonded connection.

The casing tube and/or the supporting element can therefore be formed in a simple and cost-effective manner. Above all complicated geometries, for example the fastening structure running in the direction of the longitudinal axis, can thus be produced particularly cost-effectively.

A particularly simple and secure fastening is possible if the fastening structure comprises longitudinal grooves which face away from each other and in which the supporting element engages in the mounted state. The supporting element preferably engages in the grooves and engages around the outer portion of the outer casing tube, said outer portion lying between the grooves. This forms an extensive contact region which can be used for secure fastening of the supporting element. A rail connection is therefore created between the casing tube and the supporting element, wherein the fastening structures are formed matching or corresponding to each other. In particular, this makes it possible to realize a form-fitting connection which in a simple manner permits precise positioning and is particularly reliable and loadable.

In particular, the supporting element can be caulked, pressed, welded or adhesively bonded to the casing tube. A force-fitting and/or integrally bonded connection can thereby be formed.

The caulking is undertaken by plastic deformation of the casing tube and/or of the supporting element, as a result of which the supporting element is fixed to the casing tube in a predefined position. The pressing can be undertaken by the fact that the fastening structures have an excess size with respect to each other, thus resulting in the formation of an interference fit between the components. The welding of casing tube and supporting element can preferably take place by means of laser welding.

The supporting element preferably comprises side walls which, in the mounted state, extend away from the grooves and which are oriented with flat sides parallel to the longitudinal axis of the steering spindle and with short end sides transversely with respect to said longitudinal axis.

This produces a channel between the side walls which is usable for fastening purposes.

The side walls can preferably each be provided with an elongate recess, the longitudinal extent of which is oriented parallel to the longitudinal axis. The recesses can be designed, for example, as elongated holes or bores.

A tubular bushing can preferably be arranged in the recesses transversely with respect to the longitudinal axis, said tubular bushing defining a pivot axis which is configured as a fastening element for fastening the steering column in this region to the motor vehicle or to the bracket of the steering column, and which, in the mounted state, serves as the bearing axis for the vertical pivoting of the steering column during operation.

In particular in the event of a crash, said bushing is displaceable substantially in the direction of the longitudinal axis in the recesses. The pairing between bushing and recess can be provided here in such a manner that, during the relative displacement between supporting element and the bushing, energy is absorbed by the bushing expanding or plastically deforming the recesses of the supporting element. By means of this controlled shifting of the supporting element and the casing tube connected thereto in relation to the bushing, which is connected to a structure mounted on the vehicle, the occupant protection in the event of a frontal impact of the vehicle can be improved.

A guide groove in which a sliding member is guided with friction is preferably provided in the supporting element between the side walls. The friction permits the energy absorption if, in the event of a crash, the sliding member moves in the groove.

Preferably, the guide groove is a T-groove, and the sliding member is a sliding block. The guide groove and the sliding member can likewise also be provided with a dovetail profile.

The sliding member can be fastenable here in the guide groove with a fastening means. The friction of the sliding member in the guide groove is preferably adjustable with the fastening means. This is possible in a particularly simple and reliable manner if the fastening means is a threaded screw.

In particular, an energy absorption device which is independent and can be manufactured separately from the casing unit is provided in the event of a crash if the sliding member projects into a region between the recesses in such a manner that the bushing, which is mounted on the vehicle body during the operation, carries along the sliding member during a movement in the direction of the longitudinal axis within the recesses. As a result, the sliding member can dissipate or absorb energy because of the friction in the guide groove.

The steering column preferably comprises an inner casing tube in which the steering spindle is accommodated so as to be rotatable about the longitudinal axis, and the casing tube accommodates the inner casing tube, wherein the casing tube comprises a longitudinal slot extending in the direction of the longitudinal axis, wherein a tensioning apparatus which can be switched between a release position, in which the inner casing tube is adjustable in relation to the casing tube, and a fixing position, in which the inner casing tube is fixed in relation to the casing tube, wherein the tensioning apparatus comprises a tensioning pin which is guided by a recess in the casing tube transversely with respect to the longitudinal axis, and wherein the longitudinal slot has a greater width in the release position than in the fixing position.

Accordingly, a method for producing a steering column for a motor vehicle is proposed, wherein the steering column comprises a casing tube in which a steering spindle is mounted so as to be rotatable about a longitudinal axis, and a supporting element, wherein the casing tube comprises a fastening structure running in the direction of the longitudinal axis, and wherein the supporting element comprises parallel rails, with the method steps:
a) providing the casing tube,
b) pushing the supporting element with its rails into the longitudinal grooves,
c) positioning the supporting element at a predefined longitudinal position,
d) fixing the supporting element at the positioned longitudinal position.

The method according to the invention makes it possible to produce a steering column rapidly and cost-effectively without separate machining steps being required for attaching the supporting element.

The longitudinal position is the position in the direction of the longitudinal axis.

The method preferably comprises the following further method steps for producing the steering column:
producing an single blank of the casing tube in an extrusion process,
cutting the single blank to a required component length in order to produce the casing tube which, in accordance with the abovementioned method steps, is completed to form the steering column.

The casing tube comprises longitudinal grooves, wherein said longitudinal grooves are formed directly by the extrusion process. This means that the longitudinal grooves do not have to be introduced retrospectively into the blank of the casing tube by machining.

Overall, cost advantages also arise by the simple modular design and the simple manufacturing of different steering columns using identical parts in the region of the pivot bearing and of the energy absorption device for various types.

Figure 1:
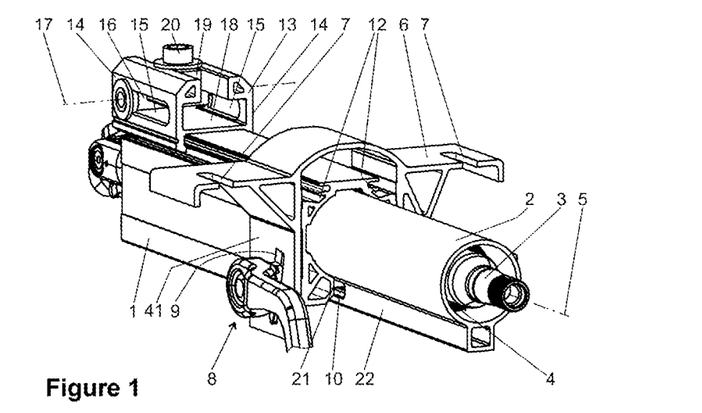
FIG. 1 is a perspective view of an example steering column.

FIG. 1 illustrates a steering column with a casing tube 1 and an inner casing tube 2 in a perspective view. The casing tube 1 may also be referred to here as outer casing tube 1. The interior of the inner casing tube 2 bears an upper steering spindle 3 which is mounted in a rolling bearing 4 so as to be rotatable about a longitudinal axis 5. The longitudinal axis 5 defines an axial direction of the steering column arrangement, in which the inner casing tube 2 is displaceable in relation to the outer casing tube 1 in the manner of a telescope.

The outer casing tube 1 is held in a bracket 6 which is provided with cutouts 7 for fastening the brackets 6 to a vehicle body. The bracket 6 comprises two side cheeks 41 and furthermore a tensioning apparatus 8 which passes through the bracket 6 transversely with respect to the longitudinal axis 5 and which permits a height adjustment of the outer casing tube 1 in relation to the bracket 6 and an axial adjustment of the inner casing tube 2 in relation to the outer casing tube 1. For this purpose, the bracket 6 is provided with guide slots 9, and the inner casing tube 2 is provided with a guide slot 10.

The outer casing tube 1 furthermore bears a lower steering shaft or steering spindle 11 which is mounted in a rolling bearing (not visible here) within the outer casing tube 1. The upper steering spindle 3 and the lower steering spindle 11 are connected to each other in a manner fixed against rotation, but so as to be telescopic, as is customary in the prior art.

The upper side of the outer casing tube 1 comprises longitudinal grooves 12 which face away from each other and in which a supporting element 13 engages. In the manner of a slide in the direction of the longitudinal axis 5 in the grooves, the supporting element 13 is placed onto the outer casing tube 1 and fastened there, for example by caulking. For this purpose, the supporting element 13 engages in the grooves 12 in the manner of a clamp and engages around the upper, outer portion of the outer casing tube 1 located between the grooves 12. The fastening can alternatively or additionally be undertaken by adhesive bonding or welding. The supporting element 13 furthermore comprises side walls 14 which, in the mounted state according to FIG. 1, extend upward from the grooves 12 and which are oriented with their flat sides parallel to the longitudinal axis 5 and with their short end sides transversely with respect to the longitudinal axis 5. The sides 14 are each provided with an elongate recess 15, the longitudinal extent of which is oriented parallel to the longitudinal axis 5. A tubular bushing 16 which defines a pivot axis 17 is arranged in the recesses 15 transversely with respect to the longitudinal axis 5. The pivot axis 17 is fastened to the motor vehicle and, after assembly of the steering column arrangement in a motor vehicle, is oriented substantially transversely with respect to the direction of travel and horizontally. The pivot axis 17 serves as a bearing axis for the vertical pivoting, also called height adjustment, of the steering column during operation.

Between the sides 14, a T-groove 18 which extends parallel to the longitudinal axis 5 is provided in the supporting element 13. The inner, free cross section of the T-groove 18 bears a sliding block 19 which is fastenable in the guide element by a threaded screw 20.

On its lower side, which also points downward upon fitting into a vehicle, the outer casing tube 1 comprises a longitudinal slot 21 in which a downwardly pointing web 22, which is integrally formed on the lower side of the inner casing tube 2 in the longitudinal direction of the longitudinal axis 5 during the extrusion process for the inner casing tube 2 is guided axially. During operation, the inner casing tube 2 is displaceable in the outer casing tube 2 for the purpose of the axial adjustment of the steering column as long as the tensioning apparatus 8 has been released and is therefore in a release position. When the tensioning apparatus 8 is tensioned, the outer casing tube 1 and therefore the longitudinal slot 21 is contracted and the inner casing tube 2 is clamped there in order to fix the selected axial position. A width B of the longitudinal slot 21 is reduced when the tensioning apparatus 8 is tensioned. The width corresponds to the extent of the longitudinal slot 21 in the direction of the tensioning pin 27.

The inner casing tube 2 furthermore has a circular inner cross section which can serve directly as a seat for the rolling bearing 4. A rolling bearing 4 is preferably inserted into the inner casing tube 2 with a press fit and supports the driver-side end of the upper steering spindle 3 in a rotatable manner.

Figure 2:
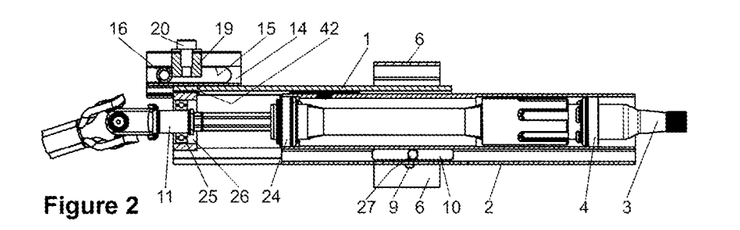
FIG. 2 is a longitudinal section view from a side of the steering column of FIG. 1.

FIG. 2 illustrates the steering column from FIG. 1 in a longitudinal section from the side.

FIG. 2 shows the inner construction of the steering column, which comprises a second rolling bearing 24 for the mounting of that end of the upper steering spindle 3 which faces away from the steering wheel. The second rolling bearing 24 is inserted in the same manner as the first rolling bearing 4 into the inner casing tube 2. It is furthermore illustrated how the lower steering spindle 11 engages in the upper steering spindle 3. The two structural elements each have a non-circular, for example cloverleaf-shaped, cross section matching each other without play, and therefore the structural elements are guided in each other fixed against rotation but in an axially displaceable and telescopic manner. Owing to this guidance, the lower steering spindle 11 requires only one rolling bearing for the rotatable mounting. The rolling bearing 25 is inserted by means of an adaptor 26 into the outer casing tube 1 at the free end thereof, through which the inner casing tube 2 does not pass.

FIG. 2 also illustrates the relative position of the inner casing tube 2 in relation to the outer casing tube 1. The position illustrated here corresponds to a central position within the adjustment range for axial adjustment, said adjustment range being available to the driver for adapting the steering wheel distance. This can be seen by the fact that a tensioning pin 27 of the tensioning apparatus 8, which is otherwise not visible here, lies centrally in the guide slot 10. Furthermore, in the position according to FIG. 2, the bushing 16 is positioned in the recess at an end remote from the steering wheel. The sliding block is fastened in the T-groove 18 in a manner lying directly against the bushing 16, and therefore the bushing 16 is secured between the ends of the recess 15 and the sliding block 19.

FIG. 2 therefore shows a central setting of the steering column during a normal operating state.

Figure 3:
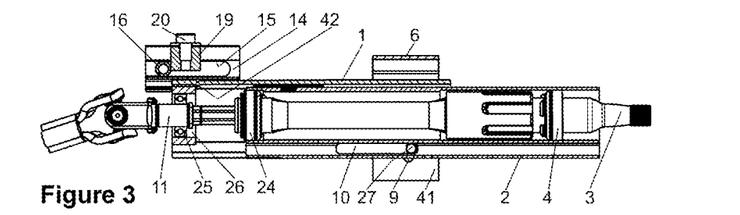
FIG. 3 is a longitudinal section view from a side of the steering column of FIG. 2 in another adjustment position.

In FIG. 3, which substantially corresponds to FIG. 2, the inner casing tube 2 has been displaced to the left in relation to the outer casing tube 1 into the outer casing tube 1 such that the tensioning pin 27 lies against that end of the guide slot 10 which is in the vicinity of the steering wheel. This position corresponds to an axial adjustment by the driver, in which the steering wheel is at the greatest possible distance from the driver in the normal driving mode and is therefore completely pushed in.

Figure 4:
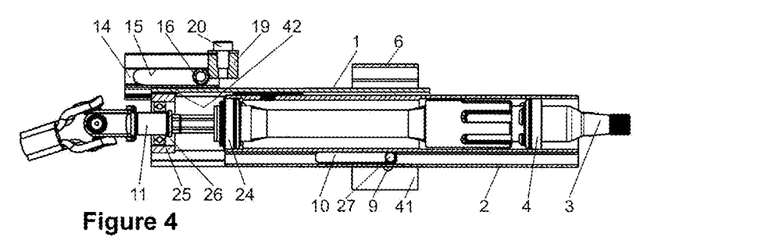
FIG. 4 is a longitudinal section view from a side of the steering column of FIGS. 2 and 3 in a pushed-together position following an impact.

FIG. 4 shows the steering column after the what is referred to as crash situation, i.e. after a frontal impact of the vehicle against an obstacle, in which the driver impacts against the steering wheel. Starting from the position according to FIG. 3, the assembly consisting of the casing tubes 1 and 2, the bracket 6 and the supporting element 13 is displaced to the left, i.e. forward in the direction of travel of the vehicle. The bracket slides here in the region of the cutouts 7 out of its fastenings to the vehicle body. The amount of the displacement corresponds to the length of the recess 15, which can be seen by the fact that the bushing 16 mounted on the vehicle body now lies against that end of the recess 15 which is in the vicinity of the steering wheel. During the impact, the supporting element 13 is therefore also displaced against the bushing 16 under the influence of the force which arises and acts at least with one component in the direction of the longitudinal axis 5. The sliding block 19 slides here along the T-groove 18. The clamping force produced by means of the threaded screw 20 causes friction of the sliding block 19 within the T-groove 18, said friction leading to an energy absorption. Said energy absorption is desirable since it damps the impact of the driver against the steering wheel and thereby reduces the risk of injury in a crash.

Figure 5:
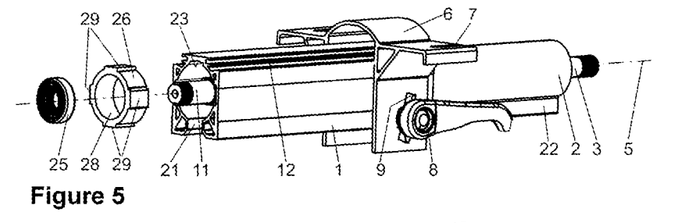
FIG. 5 is a side perspective view of the steering column of FIG. 1 facing away from the steering wheel.

FIG. 5 shows the steering column in a perspective view of the mounting of the lower steering spindle 11 in the outer casing tube 1, wherein the mounting is present here in an exploded illustration. The outer casing tube 1 as already mentioned above, is manufactured as an extruded part and therefore has a substantially uniform cross section over its longitudinal extent in the direction of the longitudinal axis 5, said cross section being substantially maintained over the entire length with respect to the longitudinal axis 5 without relatively large sections having been cut from the original blank by means of a cutting operation. In particular, the interior is bounded by an inner circumferential surface which has four partially cylindrical surfaces and three rectangular grooves 23 located inbetween. The partially cylindrical surfaces form an approximately circular-cylindrical, tubular guide into which the inner casing tube 2 is inserted. The grooves 23 and the longitudinal slot 21 arranged at the bottom are distributed at an angular distance of 90° and form a cross-shaped extension of the otherwise circular cross section.

The adaptor 26 which has a compatible outer circumferential surface with lugs 29 and also a circular-cylindrical, annular bearing seat 28 arranged on the inside is inserted into said clear opening of the outer casing tube 1. The bearing seat 28 serves for receiving the rolling bearing 25. The inner ring of the rolling bearing 25 in turn accommodates the bearing seat of the lower steering spindle 11. The rolling bearing 25 therefore supports the lower steering spindle 11 in the adaptor 26, said adaptor being fixed in turn in the outer casing tube 1. On account of the formation of the outer casing tube 1 and of the adaptor 26 as an extruded part, the adaptor 26 can be positioned at virtually any point within the outer casing tube 1. The mounting can therefore be realized for different embodiments, for example of differing length, using identical parts.

Figure 6:
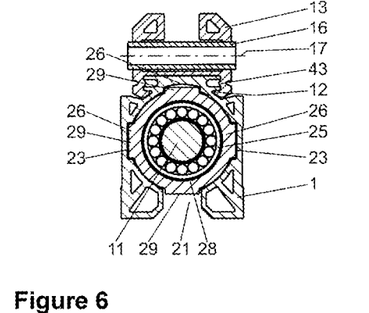
FIG. 6 is a cross sectional view through an example steering column in a region of a rolling bearing.

FIG. 6 shows a cross section in the region of the above-described mounting. It can be seen that the adaptor 26 with the lugs 29 lies in the grooves 23 of the outer casing tube 1 in a manner fixed against rotation and can be fixed there for example by adhesive bonding. The supporting element 13 engages around the grooves 12 of the casing tube 1 and is fixed to the latter by a caulking 43. For this purpose, an outer groove which extends on the outer side of the supporting element 13 has been plastically deformed locally such that a form-fitting connection is formed. The supporting element is thus non-displaceable in relation to the casing tube 1.

Figure 7:
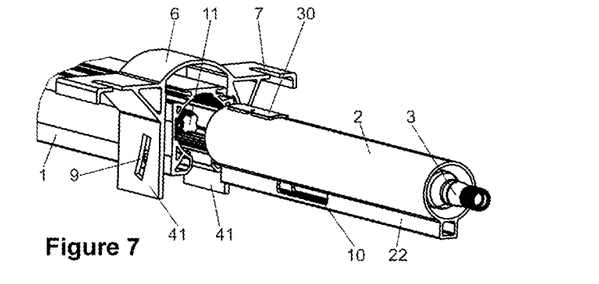
FIG. 7 is a perspective detail view of an example steering column arrangement with a separated inner casing tube.

FIG. 7 shows a perspective view of the steering column, in which the inner casing tube 2 has been pulled out of the outer casing tube 1. The inner casing tube 2 is formed with its web 22, which is integrally formed at the bottom, in such a manner that said casing tube fits into the outer casing tube 1 in a manner fixed against rotation solely because of the shape. Furthermore, the rear upper side of the inner casing tube 2 bears a rotation lock 30. The web comprises the guide slot 10 through which the tensioning pin 27 (not illustrated here) of the tensioning apparatus 8 passes. The guide slot 9 formed in the bracket 6 corresponds to the movement path of the tensioning pin 27 in relation to the bracket 6 during an adjustment operation in the vertical direction of the steering column in the motor vehicle.

Figure 8:
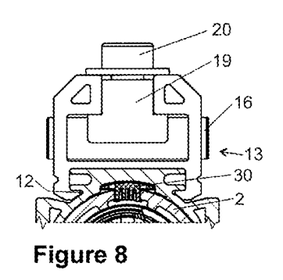
FIG. 8 is a cross sectional view illustrating an example supporting element.

The guidance of the inner casing tube 2 in the outer casing tube 1 is shown in a cross section of FIG. 8. At the same time, FIG. 8 shows the supporting element 13 in an end view. The upper side of the inner casing tube 2 bears the rotation lock 30 which engages in the upper groove 23 of the outer casing tube 1. The rotation lock 30 can also be produced from a self-lubricating plastic. The supporting element 13 with the sliding block 19 arranged in a frictionally locking manner therein and the bushing 16 has already been described above.

Figure 9:
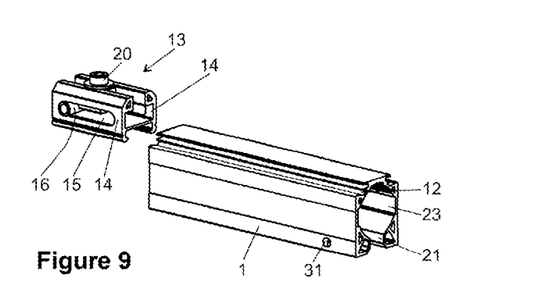
FIG. 9 is a perspective view of an example outer casing tube with a separated supporting element.

FIG. 9 shows the outer casing tube 1 with the supporting element 13 in a separate illustration before the supporting element 13 is placed onto the casing tube 1. This illustration shows the position of a bore 31 which accommodates the tensioning pin 27 (not illustrated here).

Figure 10:
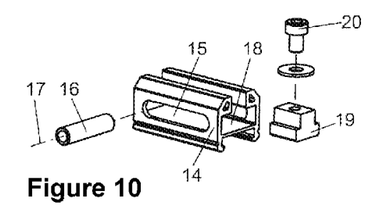
FIG. 10 is an exploded view of an example supporting element with further components.

FIG. 10 shows the supporting element 13 with the sliding block 19 and the bushing 16 in an exploded illustration.

Figure 11:
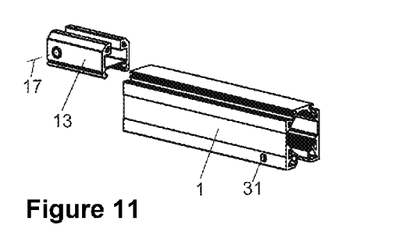
FIG. 11 is a perspective view of an example outer casing tube shown with a pivot axis.

FIG. 11 shows the outer casing tube 1 with the supporting element 13 without sliding block and bushing in an illustration as in FIG. 9.

Figure 12:
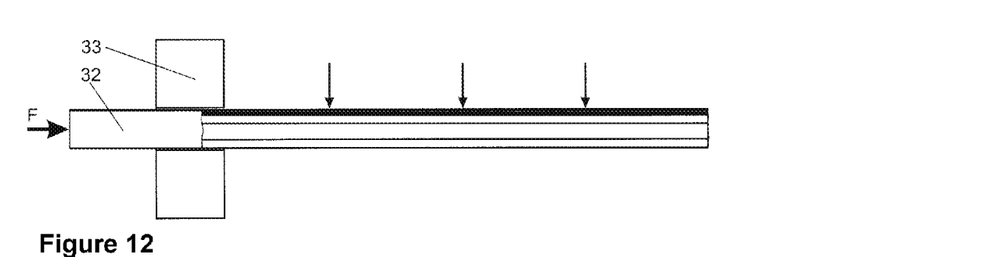
FIG. 12 is a schematic view illustrating the manufacture of an example outer casing tube by extrusion with indicated separating points for severing an extruded profile into individual blanks for outer casing tubes.

FIG. 12 shows a production method of the outer casing tube 1. From the left side of the figure, a material strand 32, for example composed of an aluminium alloy or magnesium alloy, is pressed by a pressing force F at increased temperature, through a mold 33. The molded part which arises is then a blank and has the cross-sectional shape of the outer casing tube 1. For the separation into individual workpieces, the molded part is separated at the points indicated by arrows, for example by sawing. The length of the workpieces can be varied by selection of the separating points.

Figure 13:
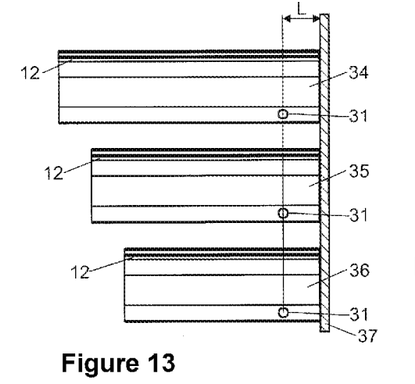
FIG. 13 is a side view illustrating example outer casing tubes of different lengths with an illustration of a standard position of a functional region.

FIG. 13 shows how a long blank 34, a medium length blank 35 and a short blank 36 are processed by provision of functional elements. In this case, the functional elements are restricted to the bore 31 for receiving the tensioning pin 27. In the three blanks 34, 35 and 36, said bore is provided at the same distance L from the right end surface of the respective blank, shown here by a contact plate 37. As has already been described above, all of the other features of the outer casing tube 1 have been produced solely by the extrusion mold. This applies, for example, to the grooves 12 and to the other features (not visible in the FIG. 13) of the inner cross section. Various component lengths are realized solely by cutting the blanks to length. The functional elements can be provided in the same device since only the front end surface is used as a reference plane.

Figure 14:
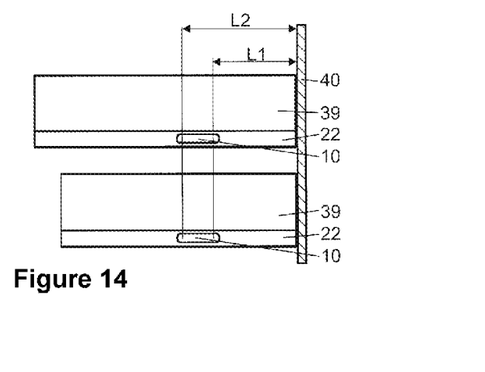
FIG. 14 is a side view of two example inner casing tubes in which a position of a functional region is illustrated.

FIG. 14 shows how a long blank 38 and a short blank 39 are processed by provision of functional elements in each case to form an inner casing tube 2. In this case, the functional elements are restricted to the guide slot 10 which is introduced into the web 22. In the two blanks 38 and 39, said guide slot 10 is provided in the same region, measured from L1 to L2, from the right end surface of the respective blank, shown here by a contact plate 40. All other features of the inner casing tube 2, as have already been described above, have been produced solely by the extrusion mold. This applies, for example, to the web 22 and to the other features (not visible in FIG. 14) of the inner cross section.

Various component lengths are realized solely by cutting the blanks to length. The functional elements can be provided in the same device since only the front end surface is used as a reference plane.

Thus, in a standard setting, components for steering columns of differing lengths and therefore for different vehicle platforms can be manufactured from the same extruded part in a particularly simple and cost-effective manner.

To the extent usable, the individual features which are illustrated in the individual exemplary embodiments can be combined with one another and/or replaced without departing from the scope of the invention.

LIST OF REFERENCE SIGNS

1. Outer casing tube
2. Inner casing tube
3. Steering spindle
4. Rolling bearing
5. Longitudinal axis
6. Bracket
7. Cutouts
8. Tensioning apparatus
9. Guide slots
10. Guide slot
11. Steering spindle
12. Grooves
13. Supporting element
14. Side walls
15. Recess
16. Tubular bushing
17. Pivot axis
18. T-groove
19. Sliding block
20. Threaded screw
21. Longitudinal slot
22. Web
23. Groove
24. Rolling bearing
25. Rolling bearing
26. Adaptor
27. Tensioning pin
28. Bearing seat
29. Lug
30. Rotation lock
31. Bore
32. Material strand
33. Mold
34. Blank
35. Blank
36. Blank
37. Contact plate
38. Blank
39. Blank
40. Contact plate
41. Side cheek
42. Caulking
43. Caulking

What is claimed is:

1. A steering column for a motor vehicle comprising:
a casing tube;
a steering spindle that is mounted in the casing tube so as to be rotatable about a longitudinal axis;
a supporting element that is configured as a separate component and is fastened non-releasably on the casing tube; and
a pivot bearing configured to enable height adjustment of the steering column, the pivot bearing defining a pivot axis about which the casing tube pivots to adjust the height of the steering spindle, the pivot bearing being disposed on a region of the steering column that is remote from a driver-side end of the steering spindle, wherein the pivot bearing is either disposed or formed in the supporting element;

wherein the casing tube comprises a fastening structure that extends in a direction of the longitudinal axis, wherein the supporting element is fastenable to the fastening structure, and wherein the fastening structure comprises longitudinal grooves that face away from each other, wherein the supporting element engages in the longitudinal grooves.

2. The steering column of claim 1 wherein the supporting element is caulked, pressed, welded, or adhesively bonded to the casing tube.

3. The steering column of claim 1 wherein the supporting element engages around an outer portion of the casing tube positioned between the longitudinal grooves.

4. The steering column of claim 1 wherein the supporting element comprises side walls that in a mounted state extend away from the longitudinal grooves and are oriented with flat sides parallel to the longitudinal axis.

5. The steering column of claim 4 wherein each of the side walls of the supporting element include an elongate recess, wherein a longitudinal extent of each elongate recess is oriented parallel to the longitudinal axis.

6. The steering column of claim 5 further comprising a tubular bushing disposed in the elongate recesses transversely with respect to the longitudinal axis, wherein the tubular bushing defines the pivot axis and is configured as a fastening element for fastening the steering column to the motor vehicle and in the mounted state serves as a bearing axis for vertically pivoting the steering column during operation.

7. The steering column of claim 6 wherein the supporting element comprises a guide groove disposed between the side walls, wherein a sliding member is guided with friction in the guide groove, wherein the sliding member projects into a region between the elongate recesses such that the tubular bushing carries along the sliding member during a movement in a direction of the longitudinal axis within the elongate recesses.

8. The steering column of claim 1 wherein the supporting element comprises a guide groove disposed between the side walls, wherein a sliding member is guided with friction in the guide groove.

9. The steering column of claim 8 wherein the guide groove is a T-groove, wherein the sliding member is a sliding block.

10. The steering column of claim 8 wherein the sliding member is fastenable in the guide groove with a fastening means.

11. The steering column of claim 1 further comprising fastening elements for fastening the steering column on the vehicle body.

* * * * *